US009052180B2

(12) United States Patent
Popescu et al.

(10) Patent No.: US 9,052,180 B2
(45) Date of Patent: Jun. 9, 2015

(54) SPATIAL LIGHT INTERFERENCE TOMOGRAPHY (71) Applicant: The Board of Trustees of the University of Illinois, Urbana, IL (US)

(72) Inventors: Gabriel Popescu, Champaign, IL (US); Zhuo Wang, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 175 days.

(21) Appl. No.: 13/727,875

(22) Filed: Dec. 27, 2012

(65) Prior Publication Data
US 2013/0169969 A1 Jul. 4, 2013

Related U.S. Application Data (60) Provisional application No. 61/582,599, filed on Jan. 3, 2012.

(51) Int. Cl.
*G01B 9/02* (2006.01)
(52) U.S. Cl.
CPC .................................. *G01B 9/02091* (2013.01)
(58) Field of Classification Search
CPC ............ G01B 9/02091; G01B 9/0209; G01B 9/02063; G01B 9/0203; G01B 9/02; G01B 9/02004; G01N 2015/1454; G01N 15/1434; G01N 21/4795; G01N 2021/1787; G01J 11/00; G01J 9/02; G01J 3/453; G01J 3/021
USPC ................... 356/450, 479, 456, 485; 600/425
See application file for complete search history.

(56) References Cited

U.S. PATENT DOCUMENTS

| 5,905,261 | A | * | 5/1999 | Schotland et al. | 250/341.8 |
| 6,002,480 | A | * | 12/1999 | Izatt et al. | 356/479 |
| 6,448,788 | B1 | * | 9/2002 | Meaney et al. | 324/637 |
| 8,184,298 | B2 | | 5/2012 | Popescu et al. | 356/450 |
| 2003/0065268 | A1 | * | 4/2003 | Chen et al. | 600/473 |
| 2003/0099329 | A1 | * | 5/2003 | Schotland et al. | 378/210 |
| 2004/0262520 | A1 | * | 12/2004 | Schotland et al. | 250/341.1 |
| 2006/0058685 | A1 | * | 3/2006 | Fomitchov et al. | 600/476 |
| 2006/0158660 | A1 | * | 7/2006 | Luttge et al. | 356/511 |
| 2008/0140341 | A1 | * | 6/2008 | Ralston et al. | 702/155 |

(Continued)

OTHER PUBLICATIONS http://en.wikipedia.org/wiki/Inverse_problem.*

(Continued)

*Primary Examiner* — Tarifur Chowdhury
*Assistant Examiner* — Mohamed Amara
(74) *Attorney, Agent, or Firm* — Sunstein Kann Murphy & Timbers LLP (57) ABSTRACT

Methods and a computer readable medium for deriving a quantitative phase contrast tomographic image of a specimen. The specimen is illuminated and a focus of the illuminating light is scanned to a plurality of depths within the specimen. Light transmitted through the specimen is spatially Fourier transformed at each of the plurality of depths to form a spatially transformed image, and at least one of the phase and amplitude of a plurality of spatial frequency components of the spatially transformed image is spatially modulated. An intensity image of the specimen plane as modulated with respect to spatial frequency components is detected and deconvolved at a plurality of spatially modulated instances to obtain a three-dimensional phase representation of the specimen at each of the plurality of distances relative to a fiducial plane.

4 Claims, 9 Drawing Sheets

(56) References Cited

U.S. PATENT DOCUMENTS

| | | | |
|---|---|---|---|
| 2009/0185191 A1* | 7/2009 | Boppart et al. | 356/479 |
| 2009/0221920 A1* | 9/2009 | Boppart et al. | 600/476 |
| 2009/0290156 A1* | 11/2009 | Popescu et al. | 356/338 |
| 2010/0098289 A1* | 4/2010 | Tognoli et al. | 382/100 |
| 2013/0051644 A1* | 2/2013 | Nett | 382/131 |
| 2013/0095519 A1* | 4/2013 | Backman et al. | 435/34 |
| 2013/0345558 A1* | 12/2013 | Boppart et al. | 600/425 |
| 2014/0219050 A1* | 8/2014 | Park et al. | 367/7 |
| 2014/0307261 A1* | 10/2014 | Popescu et al. | 356/450 |

OTHER PUBLICATIONS

Choi et al., "Extended depth of focus in tomographic phase microscopy using a propagation algorithm," *Opt. Lett.*, vol. 33, No. 2, pp. 171-173 (Jan. 15, 2008).

Cuche et al., "Digital holography for quantitative phase-contrast imaging," *Opt. Lett.*, vol. 24, No. 5, pp. 291-293 (Mar. 1, 1999).

Haldar et al., "Label-Free High-Resolution Imaging of Live Cells With Deconvolved Spatial Light Interference Microscopy," *Conf. Proc. IEEE, Eng. Med. Biol. Soc.*, pp. 3382-3385 (Aug. 31-Sep. 4, 2010).

Hillmann et al., "Holoscopy—holographic optical coherence tomography," *Opt. Lett.*, vol. 36, No. 13, pp. 2390-2392 (Jul. 1, 2011).

McNally et al., "Three-Dimensional Imaging by Deconvolution Microscopy," *Methods*, vol. 19, No. 3, pp. 373-385 (Nov. 1999).

Popescu, "Quantitative Phase Imaging of Nanoscale Cell Structure and Dynamics," *Methods Cell Biol.*, Chapter 5, vol. 90, pp. 87-115 (2008).

Wang et al., "Spatial light interference tomography (SLIT)," *Opt. Exp.*, vol. 19, No. 21, pp. 19907-19918 (Oct. 2011).

\* cited by examiner

SPATIAL LIGHT INTERFERENCE TOMOGRAPHY

This application claims priority from U.S. Provisional Patent Application Ser. No. 61/582,599, filed Jan. 3, 2012, and incorporated herein by reference.

This invention was made with government support under Grants 08-46660, 08-43604, and CBET-1040462 MRI, awarded by the National Science Foundation, and R21 MH085220, awarded by NIMH, and HD007333 awarded by the National Institute of Child Health and Human Development. The Government has certain rights in the invention.

TECHNICAL FIELD

The present invention relates to methods for label-free tomographic imaging.

BACKGROUND ART

Three-dimensional (3D) optical imaging of cells has been dominated by fluorescence confocal microscopy, wherein the specimen is typically fixed and tagged with exogenous fluorophores, as described, for example, in Pawley, *Handbook of biological confocal microscopy* (2006). The image, in confocal microscopy, is rendered serially, i.e., at successive depths, and the out-of-focus light is rejected by a pinhole in front of the detector.

Alternatively, 3D structure can also be obtained via deconvolution microscopy, in which a series of fluorescence images along the optical axis of the system is recorded, instead, as described in McNally et al., *Three-dimensional imaging by deconvolution microscopy, Methods*, vol. 19, pp. 373-85 (1999). The deconvolution numerically reassigns the out-of-focus light, instead of removing it, thus making better use of the available signal at the expense of increased computation time.

Of various biological imaging modalities, label-free methods are often preferable, especially when photobleaching and phototoxicity play a limiting role. Far-zone measurement of the scattering of electromagnetic fields, or of massive particles, has long been known to provide three-dimensional information with respect to the at the structure of weakly scattering media, and, in biology, for example, has enabled discoveries, from the structure of the DNA molecule to that of the ribosome. Despite the great success of methods based on scattering and analysis, such methods have suffered from the so-called "phase problem," as discussed by Wolf, *History and Solution of the Phase Problem in Theory of Structure Determination of Crystals from X-Ray Diffraction Measurements*, in *Advances in Imaging and Electron Physics* (Hawkes, ed.) (2011), which is incorporated herein by reference. Reconstructing a 3D structure from measurements of scattered fields entails solving an inverse scattering problem, which, in turn, requires measurement of both the amplitude and phase of the scattered fields. The scattered fields are uniquely related to the structure of the object, however, measurement of the intensity alone does not suffice, because a given intensity may be produced by many combinations of fields, each corresponding to a different sample structure. The nonuniqueness inherent in intensity measurements may be overcome, under certain circumstances, by prior assumptions and within certain approximations.

In the optical regime, interferometric experiments may practicably yield not only the scattered intensity but the full complex scattered field, with holography serving as an example. Holographic data obtained from many view angles are sufficient for the unambiguous reconstruction of the sample. Such solution of the inverse scattering problem with light was presented by Wolf, and the approach became known as diffraction tomography. Various approaches for 3D reconstructions of transparent objects have been reported, such as Hillmann et al., *Holoscopy—holographic optical coherence tomography, Opt. Lett.*, vol. 36, pp. 2390-92 (2011). Some of the drawbacks of diffraction tomography and of holographic optical coherence tomography (OCT) that render them inappropriate for bioimaging applications involving single cells. Neither OCT nor holographic techniques yield the necessary resolution for reconstructing the internal structure of a single cell. Holographic methods based on laser illumination suffer from speckles that degrade the contrast to noise ratio and ultimately the resolution of the image. On the other hand, OCT-based approaches are typically targeted toward deep tissue imaging rather than single cell imaging because the longitudinal resolution is typically larger than a cell thickness. Further, for backscattering methods such as OCT, the physical significance of the measured phase, crucial for the 3D reconstruction, is elusive because the spatial coherence of the field is degraded.

Further, QPI-based projection tomography has been applied to live cells, as described in Choi, et al., *Tomographic phase microscopy, Nat. Methods*, vol. 4, pp. 717-19 (2007). However, the approximation used in this computed tomography fails for high numerical aperture imaging, where diffraction and scattering effects are essential and drastically limit the depth of field that can be reconstructed reliably in live cells. This problem was recognized by Choi et al., who attempted to alleviate the problem by extending the depth of focus numerically, in Choi et al., *Extended depth of focus in tomographic phase microscopy using a propagation algorithm, Opt. Lett.*, vol. 33, pp. 171-73 (2008). One of the disadvantages of the technique suggested by Choi et al. is that the propagation algorithm must be recursively applied at each depth d for which a solution is sought. Furthermore, the signal-to-noise degrades quickly outside the depth of field of the imaging optics, which hampers numerical reconstruction.

Haldar et al., *Label-Free High-Resolution Imaging of Live Cells with Deconvolved Spatial Light Interference Microscopy, IEEE EMBC* 2010, pp. 3382-85 (2010) teaches a deconvolution-based approach to spatial light interference microscopy based on determining, and then deconvolving, the point spread function (PSF) of the microscope in order to obtain two-dimensional imaging data.

Digital holography is another prior art method that has been applied to three-dimensional imaging, as described by Depeursinge, *Digital holography applied to microscopy*, in *Digital Holography and Three-Dimensional Display* (Poon, ed.), p. 98 (2006), incorporated herein by reference.

Spatial Light Interference Microscopy has been taught as a method of quantitative phase imaging (QPI) in U.S. patent application Ser. No. 12/454,660 (hereinafter, the Popescu '660 application), filed May 21, 2009, and incorporated herein by reference, and in references cited therein. The approximations employed therein, however, fail for high-numerical-aperture imaging, where diffraction and scattering effects are essential, and drastically limit the depth of field that can be reconstructed reliably.

QPI is an active field of study and among various experimental approaches that have been proposed and demonstrated are the techniques taught by Popescu, et al., *Quantitative phase imaging of nanoscale cell structure and dynamics*, in *Methods in Cell Biology*, vol. 90, pp. 87-115 (2008), incorporated herein by reference. Radon-transform-based reconstruction algorithms together with phase-sensitive measurements have enabled optical tomography of transparent structures, and, more recently, QPI-based projection tomography has been applied to live cells, as described, for example, by Choi et al., *Tomographic phase microscopy, Nat. Methods*, vol. 4, pp. 717-19 (2007). However, the approximation used in computed tomography, as described in any of the prior art listed above, fails for high-numerical-aperture imaging, where diffraction effects are significant and limit the depth of field that can be reconstructed reliably.

SUMMARY OF EMBODIMENTS OF THE INVENTION

In accordance with embodiments of the invention, methods are provided for generating high-resolution quantitative phase images throughout a probed volume. In one embodiment of the invention, a method is provided for deriving a quantitative phase contrast tomographic image of a specimen having steps of:
  a. illuminating the specimen with illuminating light characterized by a coherence length substantially shorter than a dimension of a feature of the specimen to be resolved;
  b. scanning a focus to a plurality of depths within the specimen;
  c. spatially Fourier transforming light transmitted through the specimen at each of the plurality of depths to form a spatially Fourier transformed image;
  d. spatially modulating at least one of the phase and amplitude of a plurality of spatial frequency components of the spatially Fourier transformed image;
  e. detecting an intensity image of the specimen plane as modulated with respect to spatial frequency components and as interfered with an unscattered component of the illuminating light;
  f. deconvolving the intensity image at a plurality of spatially modulated instances to obtain a three-dimensional phase representation of the specimen at each of the plurality of distances relative to a fiducial plane; and
  g. further deconvolving a modeled point spread function from the three-dimensional phase representation to obtain at least one slice of the quantitative phase contrast tomographic image at a specified depth into the specimen.

In accordance with an alternative embodiment of the invention, there may be a preliminary step of imaging point scatterers to obtain the modeled point spread function.

In accordance with a further embodiment of the invention, the step of deconvolving a modeled point spread function from the three-dimensional phase representation may be performed iteratively in the spectral domain.

In accordance with yet another embodiment of the invention, a non-transitory computer readable medium for use on a computer system is provided for deriving a quantitative phase contrast tomographic image of a specimen. The computer readable medium has computer readable program code with:
  a. a computer code module for scanning a focus of illuminating light to a plurality of depths within the specimen;
  b. a computer code module for spatially Fourier transforming light transmitted through the specimen at each of the plurality of depths to form a spatially transformed image;
  c. a computer code module for spatially modulating at least one of the phase and amplitude of a plurality of spatial frequency components of the spatially transformed image;
  d. a computer code module for deconvolving a detected intensity image at a plurality of spatially modulated instances to obtain a three-dimensional phase representation of the specimen at each of the plurality of distances relative to a fiducial plane; and
  e. a computer code module for further deconvolving a modeled point spread function from the three-dimensional phase representation to obtain at least one slice of the quantitative phase contrast tomographic image at a specified depth into the specimen.

BRIEF DESCRIPTION OF THE DRAWINGS

The foregoing features of the invention will be more readily understood by reference to the following detailed description, taken with reference to the accompanying drawings, in which:

FIGS. 2A-D show 3D sectioning using spatial light interference microscopy (SLIM).

FIG. 4A shows the point spread function (PSF) (in the x-z plane) of a typical optical system employed in practice of the present invention, while

DETAILED DESCRIPTION OF EMBODIMENTS OF THE INVENTION

Definitions

As used herein, "label-free" refers to a method of imaging a substantially transparent sample that does not require introduction of materials, such as fluorophores or contrast agents, that are extrinsic to the imaged sample.

The term "image" shall refer to any multidimensional representation, whether in tangible or otherwise perceptible form, or otherwise, whereby a value of some characteristic (amplitude, phase, etc.) is associated with each of a plurality of locations corresponding to dimensional coordinates of an object in physical space, though not necessarily mapped one-to-one thereonto. Thus, for example, the graphic display of the spatial distribution of some field, either scalar or vectorial, such as brightness or color, constitutes an image. So, also, does an array of numbers, such as a 3D holographic dataset, in a computer memory or holographic medium. Similarly, "imaging" refers to the rendering of a stated physical characteristic in terms of one or more images.

The terms "object," "sample," and "specimen" shall refer, interchangeably, to a tangible, non-transitory physical object capable of being rendered as an image.

The term "high numerical aperture" shall characterize an optic of numerical aperture (NA) exceeding 0.1, such that approximations based on NA<<1 are inapplicable.

The term "broadband," as used interchangeably herein with the term "low-coherence," applies to a source of irradiation for which the coherence length is shorter than 30 μm, and/or for which $\Delta k/k_0$ is at least 10%, with $k_0$ denoting the central wavenumber of the spectrum illuminating the sample, while $\Delta k$ denotes the range of illuminating wavenumbers. It is to be understood that, within the scope of the present invention, the wavelength of the source may be swept in time, and that concurrent broadband illumination and post-dispersion detection is employed in preferred embodiments of the invention.

In accordance with embodiments of the present invention, methods are taught for label-free three-dimensional tomographic imaging of transparent structures. The methods described herein may be referred to as Spatial Light Interference Tomography (SLIT), and it is to be understood that the techniques described herein may also be applied to labeled samples, within the scope of the invention as claimed.

One challenge encountered in imaging unlabeled live cells stems from their transparency. As a result, unlabeled live cells scatter only weakly, and behave, effectively, as phase objects. This is to say that the effect of the cell (or other sample that acts as a phase object) is to appear in the signal as an additional delay or optical pathlength. Thus, quantifying optical path-lengths permits label-free measurements of structures and motions in a non-contact, non-invasive manner.

SLIT employs broad-band interferometry, as described in Wang et al., *Quantitative phase imaging with broadband fields, Appl. Phys. Lett.*, vol. 96, 051117 (2010), and in Wang et al., *Spatial light interference microscopy (SLIM)*, *Opt. Exp.*, vol. 19, pp. 1016-26 (2011), both of which are incorporated herein by reference. SLIT combines the foregoing broad-band interferometry with high-resolution imaging, achieved by means of high-numerical-aperture incidence of the illuminating beam onto the sample. SLIT combines white light illumination, high-numerical-aperture imaging, and phase-resolved detection, to render inhomogeneous three-dimensional distributions of refractive index.

Further description may be found in Chapter 14 of Popescu, *Quantitative phase imaging of cells and tissues*, (McGraw-Hill, New York), pp. 385ff, (2011), which is incorporated herein by reference.

Advantages of the present invention with respect to the prior art include the following. SLIT renders 3D images of transparent objects by including the scattering effects in the reconstruction. Thus, SLIT is similar in principle to diffraction tomography and superior to projected tomography. Importantly, in SLIT, the object is scanned through focus and, thus, there is no restriction on the depth of focus that can be obtained. For example, SLIT was able to reconstruct the structure of a ~1 mm human cornea. Further, the longitudinal (z) axis is mapped one-to-one without resampling, which is not the case in projection tomography techniques. Therefore, the overall computation is faster in SLIT. As mentioned above, the use of white light removes the speckles that plague laser-based methods used in projection tomography. In essence, because of the short coherence length and high numerical aperture combination, SLIT removes most of out of focus light before it is detected, which contrasts with the laser-based methods.

With respect to confocal fluorescence methods, SLIT has the advantage of being label-free, which removes the constraints due to photobleaching and phototoxicity. Further, SLIT is a full-field method and, thus, does not require raster scanning.

Figure 1:
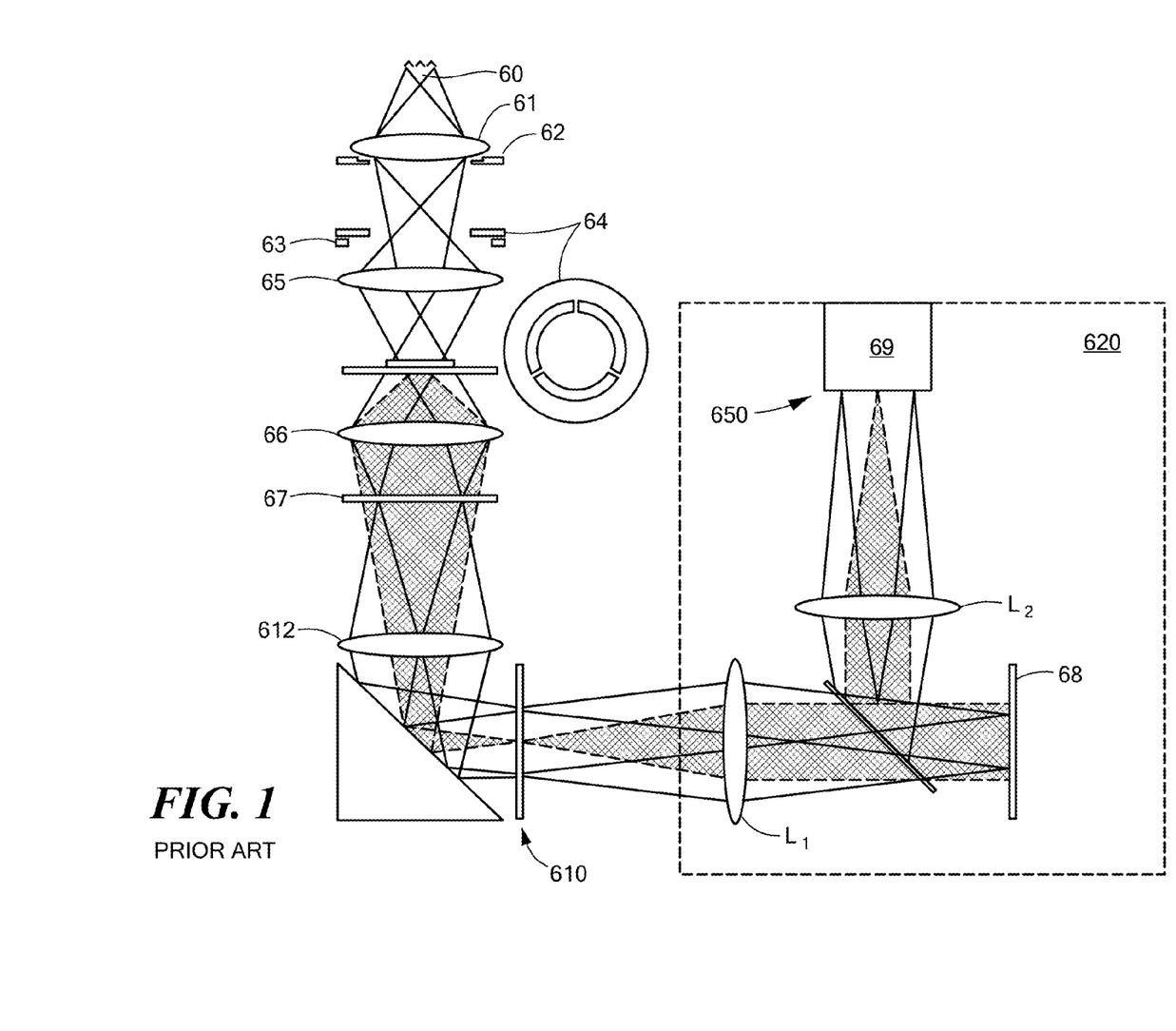
FIG. 1 is a schematic layout of one prior art system, described in the Popescu '660 application, in which methods of the present invention may advantageously be employed.

One prior art apparatus that may be used to practice the present invention is now described with reference to FIG. 1, described in greater detail in the Popescu '660 application. Filament is exemplary of A broadband light source 60 is preferably a filament, though it may be chosen from among any sources such as LASERs, LEDs, or fiber-coupled output, although it is important that source 60 be characterized by a coherence length shorter than about 10 micrometers, for reasons discussed below. Light 61 from source 60 is collected by a collector lens 62 and sequentially the filament 60, itself, is imaged onto a condenser annulus 64. Condenser annulus 64 is typically located at the focal plane of condenser 65, such that collimated light after the condenser will be focused by an objective 66 at its back focal plane 67. For a conventional phase contrast microscope, a phase objective with a built-in phase ring is used in order to introduce additional phase delay (typically π/2 for the center wavelength), and to introduce additional attenuation for undiffracted light (usually by a factor of 5). The phase image is then delivered at an interim image plane 610 and received by a charge-coupled device (CCD) or other focal plane imaging modality, or, alternatively, the interim image plane 610 may directly serve as the object of the eyepiece.

A phase objective or common bright field objective can be used in the microscope, since the back focal plane 67 is sequentially imaged by the tube lens 612 and Fourier lens $L_1$, which is relayed onto a spatial light modulator (SLM) 68. SLM 68 may be a reflective liquid crystal phase modulator (LCPM), for example, though any phase modulation modality is included within the scope of the present invention. In the present description, "LCPM" may be used, interchangeably with "SLM", and without limitation, to represent any form of phase modulation modality that is applied.

The active pattern on the LCPM is designed to precisely match the size and position of the phase ring image, such that additional phase delay can be applied controllably between the scattered and unscattered components of the image field. By displaying different masks on the SLM, one may directly modulate the phase or amplitude, or both, of spatial frequency components of the image. This modulation may be referred to herein, and in any appended claims, as "spatially modulating at least one of the phase and amplitude of a plurality of spatial frequency components of the image," and, to the extent to which the image is spatially Fourier transformed, also of the Fourier transformed image. The Fourier lenses $L_1$ and $L_2$, together with a SLM and focal plane array 69, comprise an optical module 620, referred to herein as a "SLIM module," which serves as a complementary component to a conventional microscope, for practice of the present invention. Techniques for obtaining quantitative phase information are described in detail in the Popescu '660 application.

Based on the first order Born approximation, as discussed, for example, in Born & Wolf, *Principles of optics: electromagnetic theory of propagation, interference and diffraction of light* ($7^{th}$ ed.), Chap. 13 (1999), which is incorporated herein by reference, a model is developed, in accordance with an embodiment of the present invention, that relates the measured optical field to a 3D convolution operation of the susceptibility and the instrument response. From the complex-field deconvolution, the 3D refractive index distribution of transparent specimens (including photonic crystals, or live cells, for example) is extracted, as now described.

SLIT Depth Sectioning Through Live Cells

In order to obtain a tomographic image of a sample, in accordance with embodiments of the present invention, axial scanning is performed by translating the sample through focus in step sizes of less than half the Rayleigh range, with an accuracy of 20 nm. At each axial position, a quantitative phase image is recorded, using the principle of spatial light interference microscopy (SLIM), described in more detail elsewhere in Wang (2010) and Wang (2011). In SLIM, the image is considered an interferogram between the scattered and unscattered fields. Shifting the relative phase between these two fields in 4 successive steps of $\pi/2$ and recording the 4 corresponding images, a quantitative pathlength map is derived associated with the specimen with sub-nanometer sensitivity. The tomographic capability of this imaging system is now described with reference to FIGS. 2A-2D.

Figure 2A:
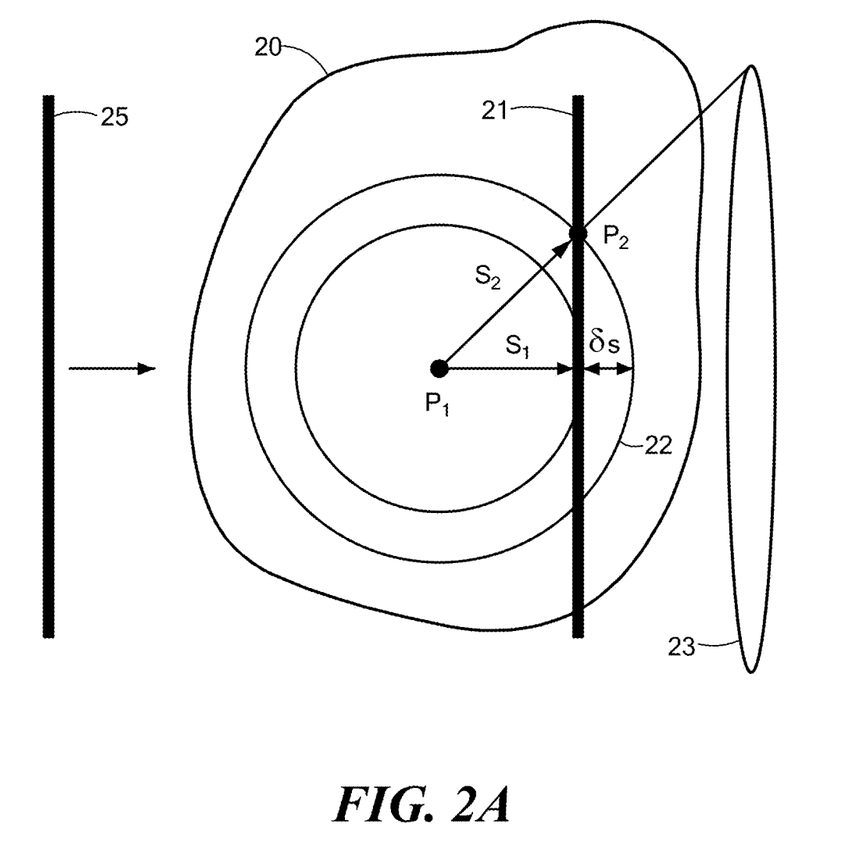
FIG. 2A is a schematic depiction of the sectioning effect of SLIM with coherence gating.

Referring to FIG. 2A, field 25 is incident upon an object of interest (or specimen) 20, $P_2$ denotes a particle in focus, while $P_1$ denotes a particle that is out-of-focus. The unscattered field 21 is a plane wave that overlaps with the scattered spherical wave 22 originating at point $P_1$. The optical pathlengths from $P_1$ and $P_2$ to the focal plane differ by $\delta s$. If $\delta s$ is larger than the coherence length, (which, under conditions of a preferred source, is typically about 1.2 µm, the two fields add incoherently, such that measuring the phase image at the plane of focus of objective lens 23 rejects contributions from points like $P_1$. It is, thus, important that the coherence length of the source be short, preferably shorter than the thickness of the object to be resolved. In the case of a live cell, this length is about 10 µm. As apparent in FIG. 2A, the larger the angle of the $P_1$-$P_2$ path with respect to the optical axis, the larger the path-length difference $\delta s$, and thus, the stronger the sectioning. Therefore a high-NA objective provides better sectioning in 3D reconstructions.

Figure 2B:
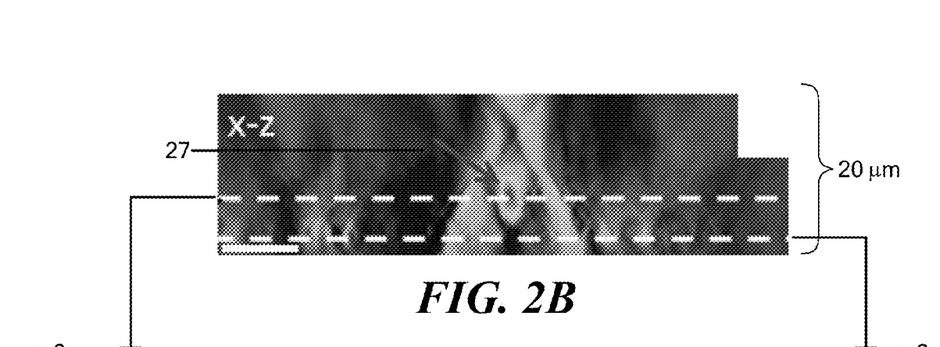
FIG. 2B is an x-z cut through a live neuron; the bottom of the image corresponds to the glass surface. The soma and nucleolus (arrow) are clearly visible.
Figure 2C:
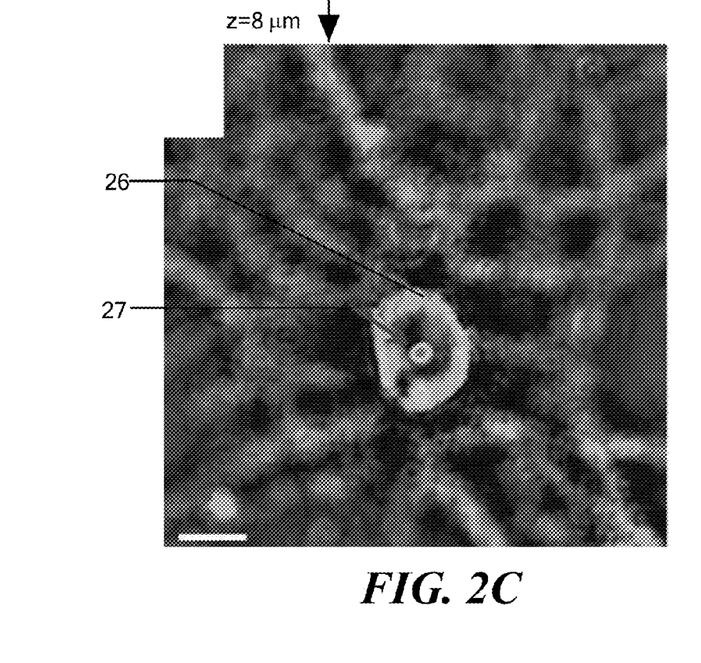
FIGS. 2C and 2D show images of the same neuron at the depths indicated by the dash lines in FIG. 2B. Scale bars for FIGS. 2B-2D indicate 10 μm.
Figure 2D:
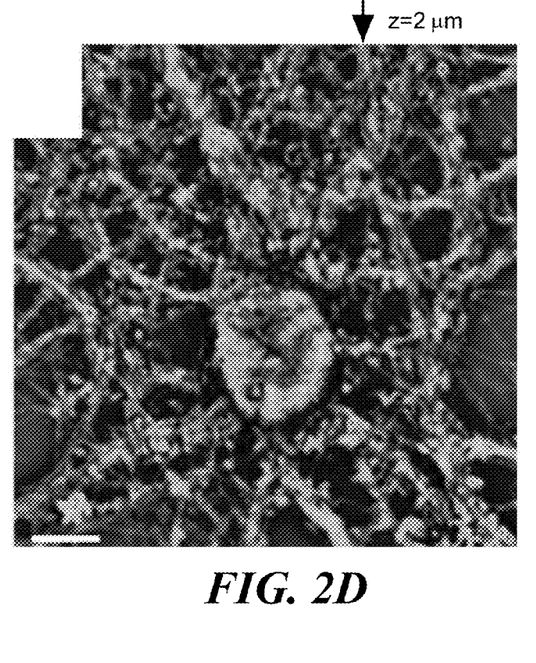

FIGS. 2B-2D illustrate this approach with quantitative phase images obtained on a live neuron. While there is certain elongation in the z-axis, as indicated especially by the shape of the cell body as seen in FIG. 2B, an x-z cut through a live neuron, with the bottom of the image corresponds to the glass surface. It is evident that SLIM provides optical sectioning without further processing. The soma and nucleolus 27 are clearly visible. Specifically, at the substrate plane (z=2 µm), as shown in Fog. 2(d), the neuronal processes are clearly in focus and the nucleolus is absent. However, 6 µm above this plane, at z=8 µm, as shown in FIG. 2C, the cell body 26 and nucleolus 27 are clearly in focus, while the contributions from the processes are subdominant. Starting with the quantitative phase images of FIGS. 2B-2D, the inverse scattering problem is solved, as detailed below.

Tomographic Reconstruction

Figure 3A:
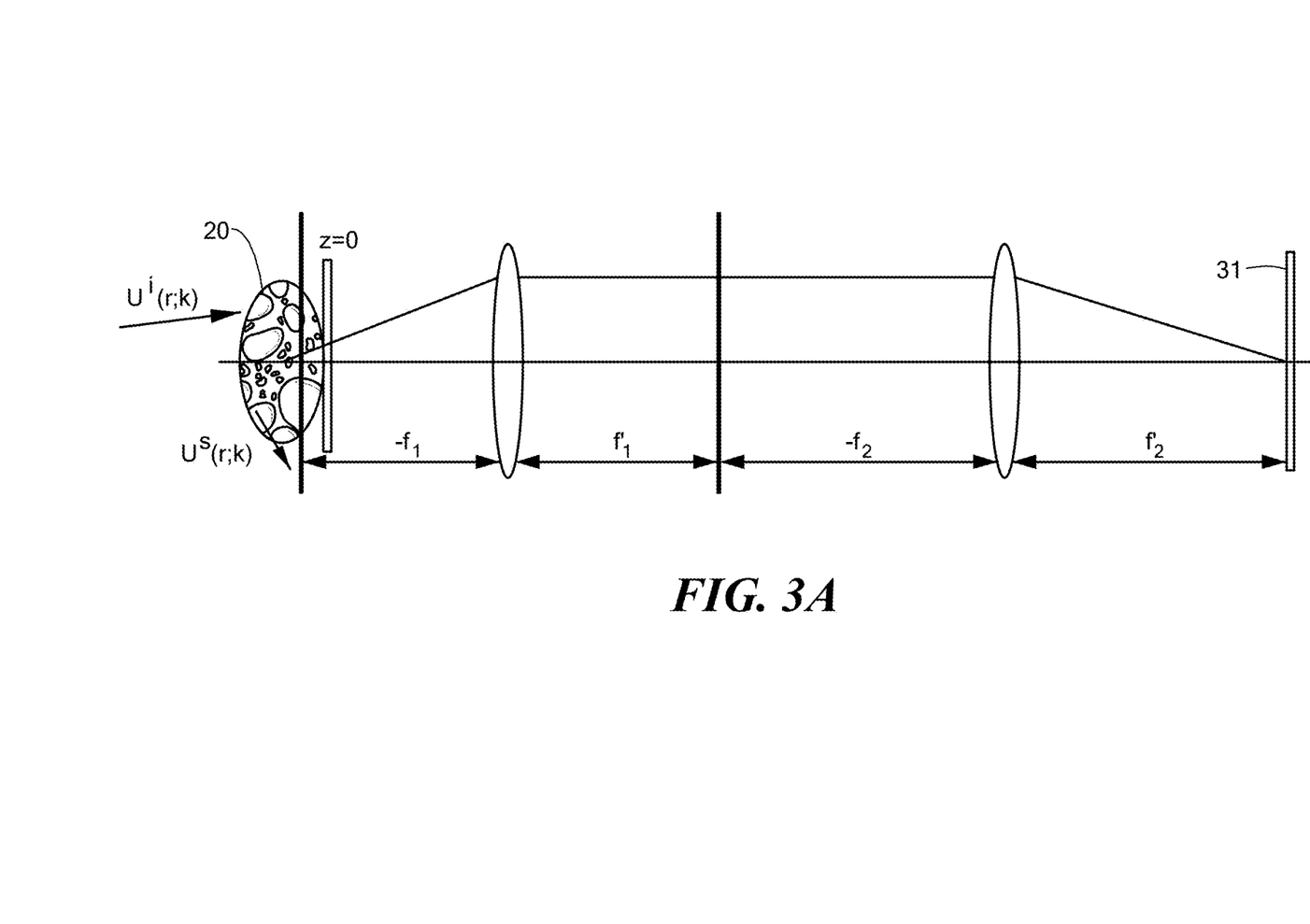
FIG. 3A schematically depicts 3D reconstruction in accordance with embodiments of the present invention.

Referring now to FIG. 3A, the scattering problem can be formulated as follows. Consider a plane wave $U^i(r; k)$ incident on the specimen, which becomes a secondary field source. The fields $U^s(r; k)$ scattered from each point within the sample propagate as spherical waves such that the unscattered plane wave interferes with the scattered field. The imaging system behaves as a band pass filter in the wave vector space (k) and collects these fields at the detector in plane 31. Tomography is made tractable by a linear forward model, used here in a first Born approximation of (weak) scattering, although it is to be understood that the invention, as claimed, is not limited to a first Born approximation. The linearity assumed here is consistent with diffraction tomography, as described by Wolf (1999).

Thus, at each optical frequency, the 3D field distribution $U(x, y, z)$, measured via depth scanning, is the result of the convolution between the susceptibility of the specimen and the point spread function, P, of the microscope, $$U(r) = \int \int_V \int \chi(r')P(r-r')d^3r', \quad (1)$$

where $\chi(r) = n^2(r) - 1$ is the spatial component of the susceptibility, assumed to be dispersion-free, and represents the quantity of interest in the reconstruction. Note that U here represents the real part (cosine component) of the complex analytic signal measured experimentally.

With $\tilde{U}(q)$, $\tilde{\chi}(q)$ and $\tilde{P}(q)$ representing the Fourier transforms of U, $\chi$, and P, respectively, Eq. 1 can be written in the frequency domain q as $$\tilde{U}(q) = \tilde{\chi}(q)\tilde{P}(q), \quad (2)$$

where indicates Fourier transformation. Thus, the Fourier transform of the susceptibility can be obtained as the ratio between the Fourier transform of the measured field and that of the instrument function, $$\tilde{\chi}(q) = \tilde{U}(q)/\tilde{P}(q), \quad (3)$$

Figure 4A:
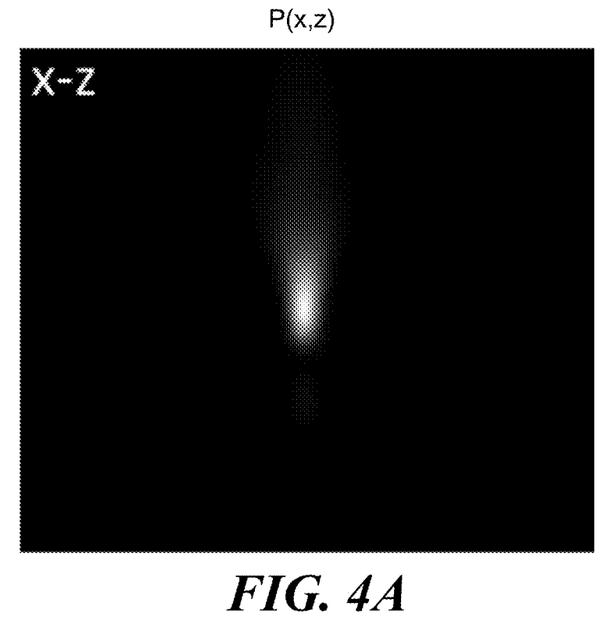
Figure 4B:
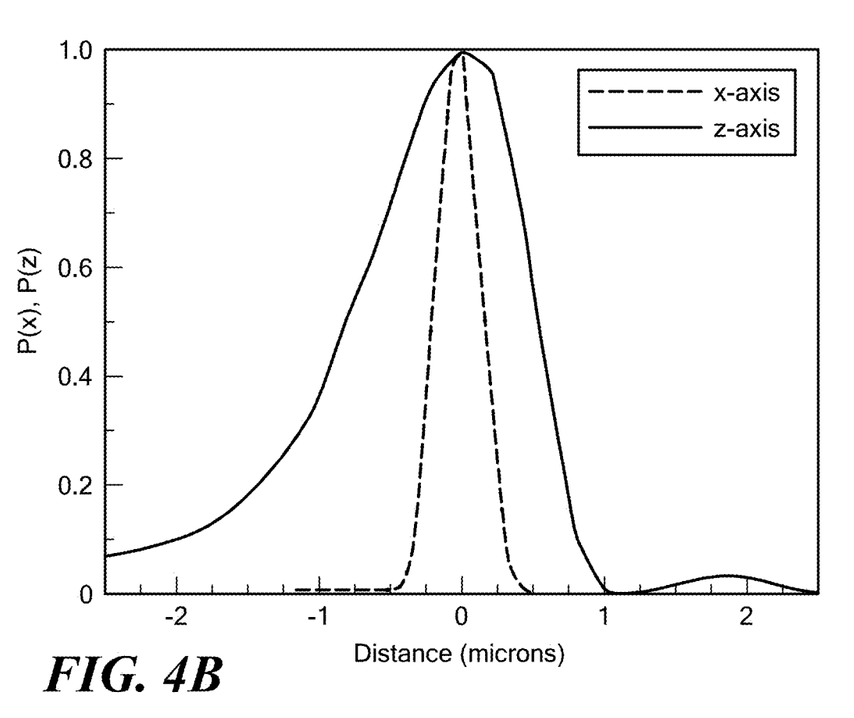
FIG. 4B shows plots of the PSF along the axial and one transverse direction.

In order to perform the deconvolution in Eq. 3, one requires the knowledge of point spread function P as a function of all 3 coordinates. In principle, P can be modelled by analysing all of the optical components. However, a complete description of the imaging system, is challenging and may be obtained experimentally, instead. Microspheres of a diameter smaller than the diffraction spot (typically, approximately one-third of the diffraction spot), and thus effectively representing point scatterers, are imaged. In one embodiment, the PSF is measured by scanning through focus a 200 nm diameter polystyrene bead for 40×/0.75 objectives (50 nm for 63×/1.4 objective). Phase and amplitude images were measured at each depth, incremented in steps of 200 nm, and function P was obtained as the real part of this measured complex analytic signal. The measured point spread function P is shown in FIGS. 4A and 4B. The full-width-half-maximum of P(x) has a value of 0.36 µm. The-full-width-half-maximum (FWHM) of the P(z) main lobe, which defines the axial resolution, has a value $\delta z = 1.34$ µm.

Figure 3B:
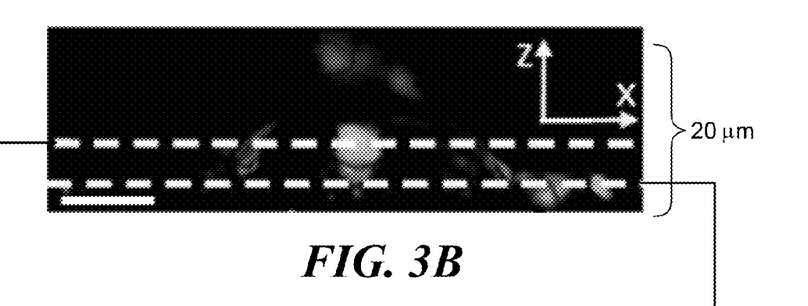
FIGS. 3B-3D correspond, respectively, to like-lettered counterparts of FIGS. 2B-2D after 3D reconstruction.
Figure 3C:
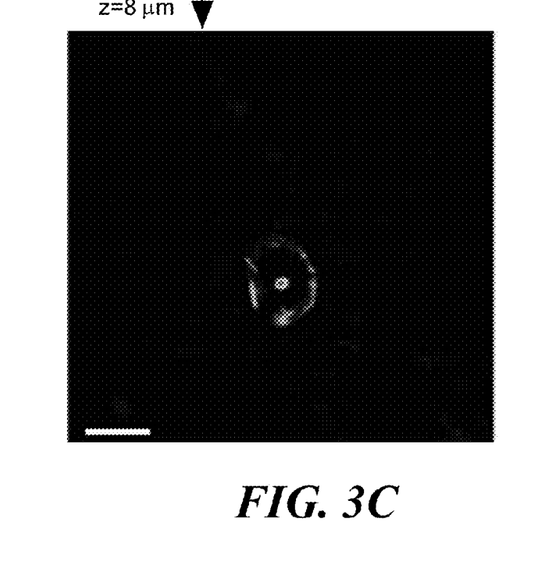
Figure 3D:
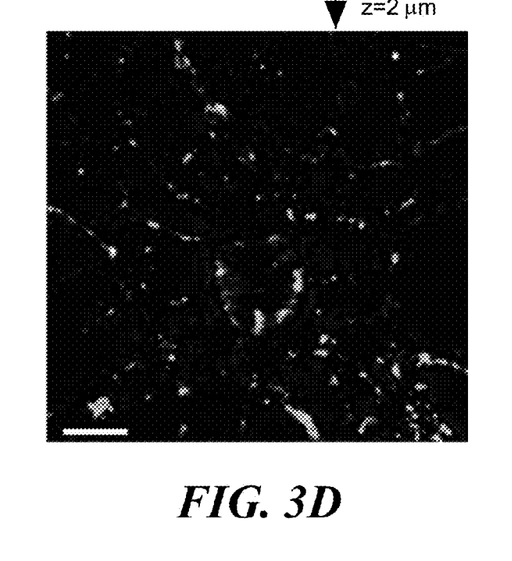

The point spread function P has finite frequency support, which makes the ratio $\tilde{\chi}(q) = \tilde{U}(q)/\tilde{P}(q)$ diverge in certain domains. Therefore, suitable regularization is required. In accordance with preferred embodiments of the invention, a conventional Wiener deconvolution procedure is performed, following the implementation by Dougherty, *Extensions of DAMAS and Benefits and Limitations of Deconvolving in Beamforming*, 11th AIAA/CEAS Aeroacoustics Conference, pp. 1-13 (2005), incorporated herein by reference, although the use of another regularization procedure is encompassed within the scope of the present invention as claimed. The reconstructed 3D refractive index map associated with the neuron in FIGS. 2(b)-2(d) is shown in FIG. 3(b)-3(d), making evident that, in the reconstructed images, most out-of-focus light is rejected after reconstruction.

Deconvolution Algorithm

A detailed mathematical description of SLIT 3D reconstruction in accordance with embodiments of the present invention employing DAMAS ("deconvolution approach for the mapping of acoustic sources") is now described.

For a transparent sample such as a live cell, the 3D complex field U that is measured is the result of the convolution between the electrical susceptibility of the specimen and the PSF of the microscope:

$$U(r) = \chi(r) \underset{3D}{\odot} P(r) \quad (4)$$

Where $\chi(r)=n^2(r)-1$ is the susceptibility, and $$\underset{3D}{\odot}$$

is the 3D spatial deconvolution. $\tilde{U}(k)$, $\tilde{\chi}(k)$ and $\tilde{P}(k$ represent the FFTs, respectively, of U(r), χ(r), and P(r).

In order to reduce the number of iterations needed for convergence, a regularized division of PSF and U by the FFT of the PSF in the spectral domain are performed, which gives the modified deconvolution problem $$U_w(r) = \chi_w(r) \underset{3D}{\odot} P_w(r). \quad (5)$$

A non-negative solution is then sought by iteration. The aforementioned algorithm can be expressed as follows:
Compute the forward FFT of U and P;
For each frequency k, computer $$\tilde{U}_w(k) = \frac{\tilde{P}^*(k)\tilde{U}(k)}{\tilde{P}^*(k)\tilde{P}(k)+\gamma} \text{ and } \tilde{P}_w(k) = \frac{\tilde{P}^*(k)\tilde{P}(k)}{\tilde{P}^*(k)\tilde{P}(k)+\gamma};$$

Compute the inverse FFT of $\tilde{P}_w(k)$ to obtain $P_w$;
Set $$a = \sum_{x,y,z} P_w;$$

Set solution χ(r)=0;
Iterate:
   (1) $\tilde{\chi}(k)$=forward FFT of [χ];
   (2) Let $\tilde{R}(k)=\tilde{P}_w(k)\tilde{\chi}(k)$;
   (3) R(r)=inverse FFT of [$\tilde{R}(k)$];
   (4) χ(r)←χ(r)+[$U_w(r)$−R(r)]/a for each r;
   (5) Replace each negative value of χ(r) by 0.

Regularization parameter γ is chosen empirically, with values in the range of about 0.0001 to 1. When the deconvolution converges, according to a specified criterion such as a change in the mean image of less than 1%, iteration is stopped.

SLIT of Standard Samples

Figure 5:
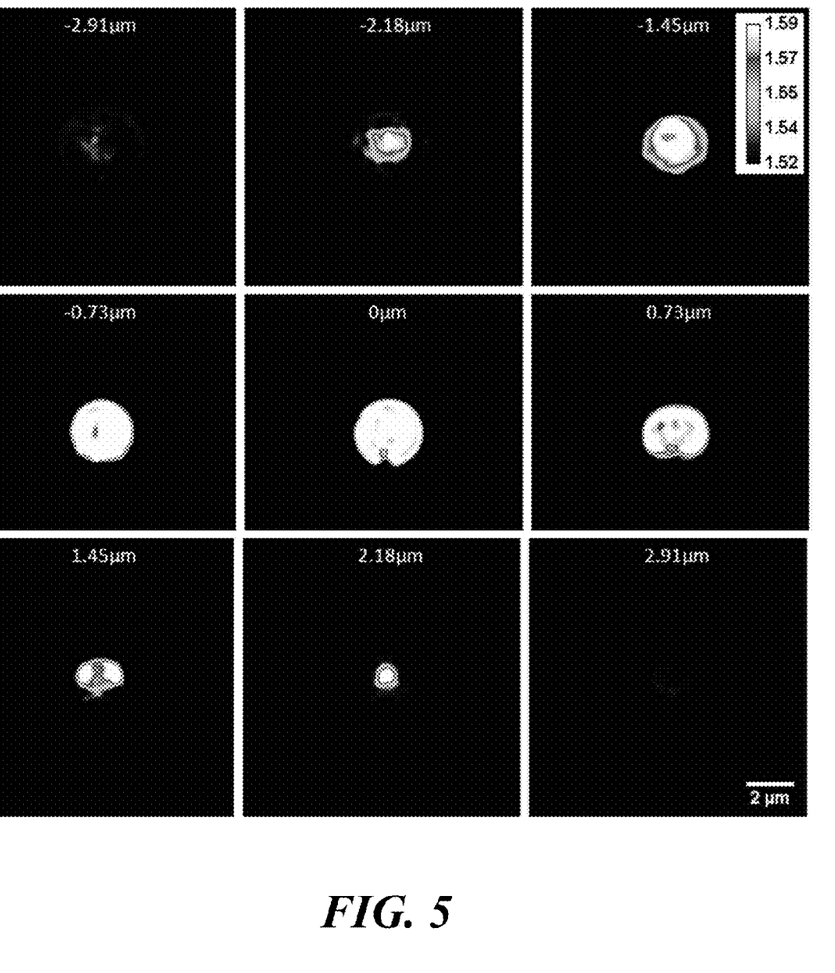
FIG. 5. Refractive index map of 3.1 μm polystyrene beads in immersion oil at different Z positions employing a method in accordance with an embodiment of the present invention.

FIG. 5 depicts the reconstructed phase map of beads (Polyscience Inc., diameter 3.12 μm) immersed in microscope immersion oil (Zeiss Immersol 518F, refractive index 1.518) at different z positions. A defect within the bead (apparently a pore) is clearly seen at the z=−1.45 μm slice. Also a cleaved edge of the beads can be found at z=0 μm.

Figure 6A:
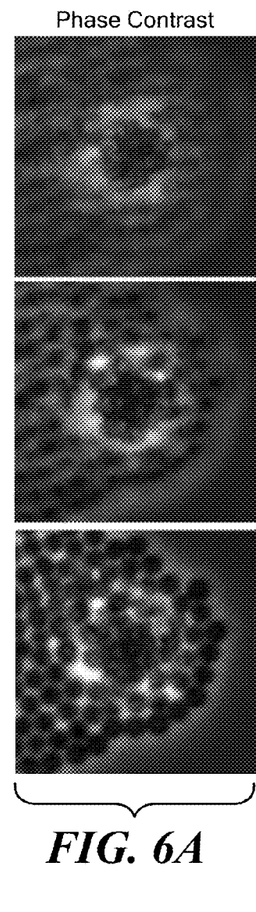
FIGS. 6A-6C show images of 1-μm glass beads in ethanol in conventional phase contrast microscopy (FIG. 6A), SLIM (FIG. 6B), and SLIT (FIG. 6C), in accordance with an embodiment of the present invention.
Figure 6B:
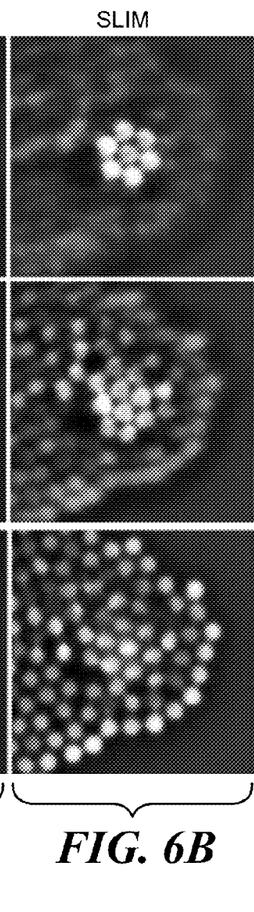
Figure 6C:
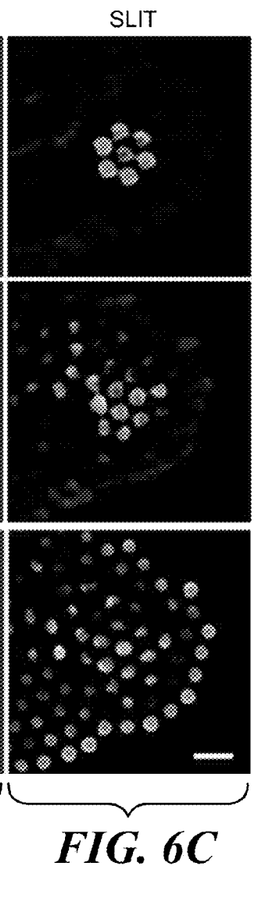

Methods in accordance with the present invention may also be applied advantageously for imaging nonbiological structures such as photonics crystals, for which the refractive index is difficult to access experimentally. SLIT was applied to photonic crystal samples obtained from 1 μm $SiO_2$ spheres dispersed in ethanol. While it is difficult to identify three consecutive layers of 1 μm silica beads via axial scanning with phase contrast microscopy, as shown in FIG. 6A, the SLIM (i.e., quantitative phase) images of FIG. 6B show clear sectioning, though out-of-focus light still persists. Sectioning is further improved with the deconvolution algorithm, as shown in the SLIT images of FIG. 6C, where most of the out-of-focus light is rejected. The notorious halo effect associated with phase contrast images is clearly visible in FIG. 6A, and still observable in the SLIM images of FIG. 6B. The tomographic reconstruction is also affected, especially in areas highlighted by the halo in the phase contrast images.

Label-Free Live Cell Tomography

Figure 7A:
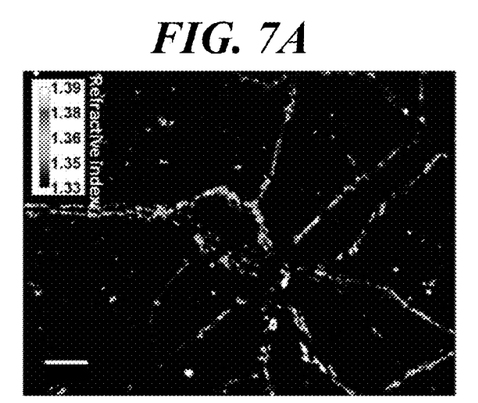
FIGS. 7A and 7B show the refractive index distribution through a live neuron at position z=0.4 μm (FIG. 7A) and 6.0 μm (FIG. 7B). The soma and nucleolus (as indicated by an arrow) are clearly visible.
Figure 7B:
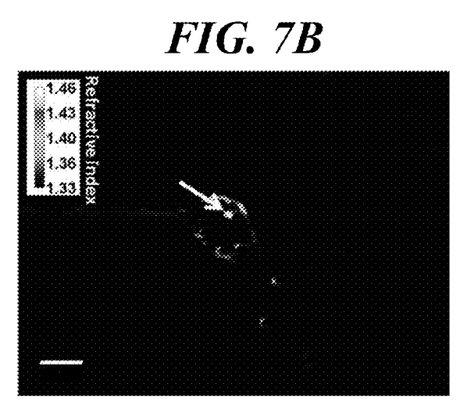

Perhaps one of the most appealing applications of SLIT is the 3D imaging of live, unstained cells. Results obtained from a single neuron are shown in FIG. 7, with FIGS. 7A and 7B showing two sections separated by 5.6 μm. Notably, for some regions of the cytoplasm, the refractive index distribution is below 1.39, which is compatible with previous average refractive index measurements on other cell types.

Figure 7C:
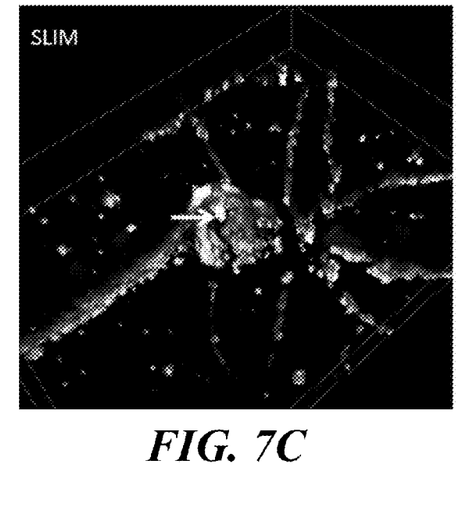
FIG. 7C is a 3D rendering of the same cell using SLIT, while FIG. 7D employs confocal microscopy of a stained neuron with same field of view.
Figure 7D:
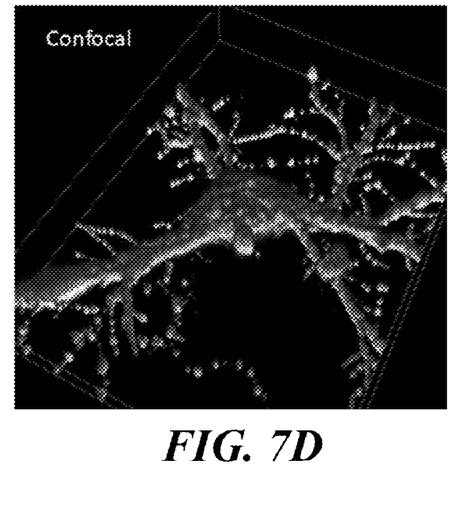

The nucleolus (arrow, FIG. 7B) has a higher value, n~1.46. FIG. 7C shows a 3D rendering of the same hippocampal neuron generated from 71 images separated by 14 μm. For comparison, fluorescence confocal microscopy was used to obtain a similar view of a different hippocampal neuron cultured under identical conditions, as shown in FIG. 7D. This neuron was stained with anti-polysialic acid IgG #735.

3D imaging by SLIT is qualitatively similar to that obtained by fluorescence confocal microscopy. However, in contrast to confocal microscopy, SLIT is label-free and enables non-invasive imaging of living cells over long periods of time, with substantially lower illumination power density.

In preferred embodiments of the present invention, the disclosed methods for 3D imaging of transparent structures are implemented as a computer program product for use with a computer system. Such implementations may include a series of computer instructions fixed either on a tangible medium, such as a non-transitory computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product). The foregoing results demonstrate that the combination of low-coherence light illumination and shallow depth of field, allows SLIT to render 3D tomographic images of transparent structures. SLIT advantageously provides stronger depth sectioning at higher numerical aperture because both the reference and the object beams are traveling through the sample. This aspect adds important versatility to SLIT, as it can adapt from low NA imaging when no sectioning is needed and, instead, the phase integral through the entire object thickness is obtained.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for deriving a quantitative phase contrast tomographic image of a specimen, the method comprising steps of:
   a. illuminating the specimen with illuminating light characterized by a coherence length substantially shorter than a dimension of a feature of the specimen to be resolved;
   b. scanning a focus of the illuminating light to a plurality of depths within the specimen;
   c. spatially Fourier transforming light transmitted through the specimen at each of the plurality of depths to form a spatially Fourier transformed image;
   d. spatially modulating at least one of the phase and amplitude of a plurality of spatial frequency components of the spatially Fourier transformed image;
   e. detecting an intensity image of the specimen plane as modulated with respect to spatial frequency components and as interfered with an unscattered component of the illuminating light;
   f. deconvolving the intensity image at a plurality of spatially modulated instances to obtain a three-dimensionally registered phase representation of light scattered by the specimen at each of the plurality of distances relative to a fiducial plane; and
   g. solving for a quantitative phase contrast tomographic image of the specimen by an inverse scattering solution, by iterative search for a point spread function entirely in a spectral domain and subject to a regularization parameter, based on a linear forward model of scattering through an imaging system.

2. A method in accordance with claim 1, further comprising deconvolving a modeled point spread function from the three-dimensional phase representation iteratively in the spectral domain.

3. A method in accordance with claim 2, further comprising a preliminary step of imaging point scatterers to obtain the modeled point spread function.

4. A non-transitory computer readable medium for use on a computer system for deriving a quantitative phase contrast tomographic image of a specimen, the non-transitory computer readable medium having computer readable program code thereon, the computer readable program code comprising:
   a. a computer code module for scanning a focus of illuminating light to a plurality of depths within the specimen;
   b. a computer code module for spatially Fourier transforming light transmitted through the specimen at each of the plurality of depths to form a spatially transformed image;
   c. a computer code module for spatially modulating at least one of the phase and amplitude of a plurality of spatial frequency components of the spatially transformed image;
   d. a computer code module for deconvolving a detected intensity image at a plurality of spatially modulated instances to obtain a three-dimensional phase representation of the specimen at each of the plurality of distances relative to a fiducial plane; and
   e. a computer code module for solving for a quantitative phase contrast tomographic image of the specimen by an inverse scattering solution, by iterative search for a point spread function entirely in a spectral domain and subject to a regularization parameter, based on a linear forward model of scattering through an imaging system.

* * * * *